US012784565B1

(12) United States Patent
Monroy et al.

(10) Patent No.: US 12,784,565 B1
(45) Date of Patent: Nov. 3, 2026

(54) SEPARATION ALERT BRACELET SYSTEM

(71) Applicants: Lorena Monroy, North Waltham, MA (US); Jose Corona Olivares, North Waltham, MA (US)

(72) Inventors: Lorena Monroy, North Waltham, MA (US); Jose Corona Olivares, North Waltham, MA (US)

( * ) Notice: Subject to any disclaimer, the term of this patent is extended or adjusted under 35 U.S.C. 154(b) by 48 days.

(21) Appl. No.: 18/974,987

(22) Filed: Dec. 10, 2024

(51) Int. Cl.
*G08B 21/02* (2006.01)

(52) U.S. Cl.
CPC ..... *G08B 21/0269* (2013.01); *G08B 21/0236* (2013.01)

(58) Field of Classification Search
CPC ........................ G08B 21/0269; G08B 21/0236
See application file for complete search history.

(56) References Cited

U.S. PATENT DOCUMENTS 5,557,259 A 9/1996 Musa
9,865,149 B1 1/2018 Pence
9,928,714 B1 3/2018 Lovell
D838,194 S 1/2019 Mays
11,127,274 B1 9/2021 Lima
2002/0080036 A1* 6/2002 Rabanne ................. G01S 19/17 340/573.4
2003/0218539 A1 11/2003 Hight
2007/0139207 A1* 6/2007 Agapi .................... G08B 21/22 702/180
2015/0035672 A1 2/2015 Housley
2018/0061203 A1* 3/2018 Shapiro ................... H04W 4/02
2020/0098247 A1* 3/2020 Moore ............... G08B 21/0288
2021/0150879 A1* 5/2021 Mann ....................... H04W 4/80
2022/0254239 A1 8/2022 Brown

FOREIGN PATENT DOCUMENTS

WO 0172466 10/2001

* cited by examiner

*Primary Examiner* — Ryan W Sherwin
(74) *Attorney, Agent, or Firm* — Kyle A. Fletcher, Esq.

(57) ABSTRACT

The separation alert bracelet system is an alarm system. The separation alert bracelet system is adapted for use with a guardian and a ward. The separation alert bracelet system establishes and monitors a virtual protected space. The separation alert bracelet system centers the virtual protected space on the guardian. The separation alert bracelet system monitors the position of the ward relative to the virtual protected space. The separation alert bracelet system generates an alarm when the location of the ward is not within the boundary of the virtual protected space. The separation alert bracelet system incorporates a first jewelry item and a second jewelry item. The first jewelry item is worn by the guardian. The second jewelry item is worn by the ward.

13 Claims, 6 Drawing Sheets

SEPARATION ALERT BRACELET SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The separation alert bracelet system is an alarm system. The separation alert bracelet system is adapted for use with a guardian and a ward. The separation alert bracelet system establishes and monitors a virtual protected space. The separation alert bracelet system centers the virtual protected space on the guardian. The separation alert bracelet system monitors the position of the ward relative to the virtual protected space. The separation alert bracelet system generates an alarm when the location of the ward is not within the boundary of the virtual protected space. The separation alert bracelet system comprises a first jewelry item and a second jewelry item. The first jewelry item is worn by the guardian. The second jewelry item is worn by the ward.

These together with additional objects, features and advantages of the separation alert bracelet system will be readily apparent to those of ordinary skill in the art upon reading the following detailed description of the presently preferred, but nonetheless illustrative, embodiments when taken in conjunction with the accompanying drawings.

In this respect, before explaining the current embodiments of the separation alert bracelet system in detail, it is to be understood that the separation alert bracelet system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the separation alert bracelet system.

It is therefore important that the claims be regarded as including such equivalent construction insofar as they do not depart from the spirit and scope of the separation alert bracelet system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
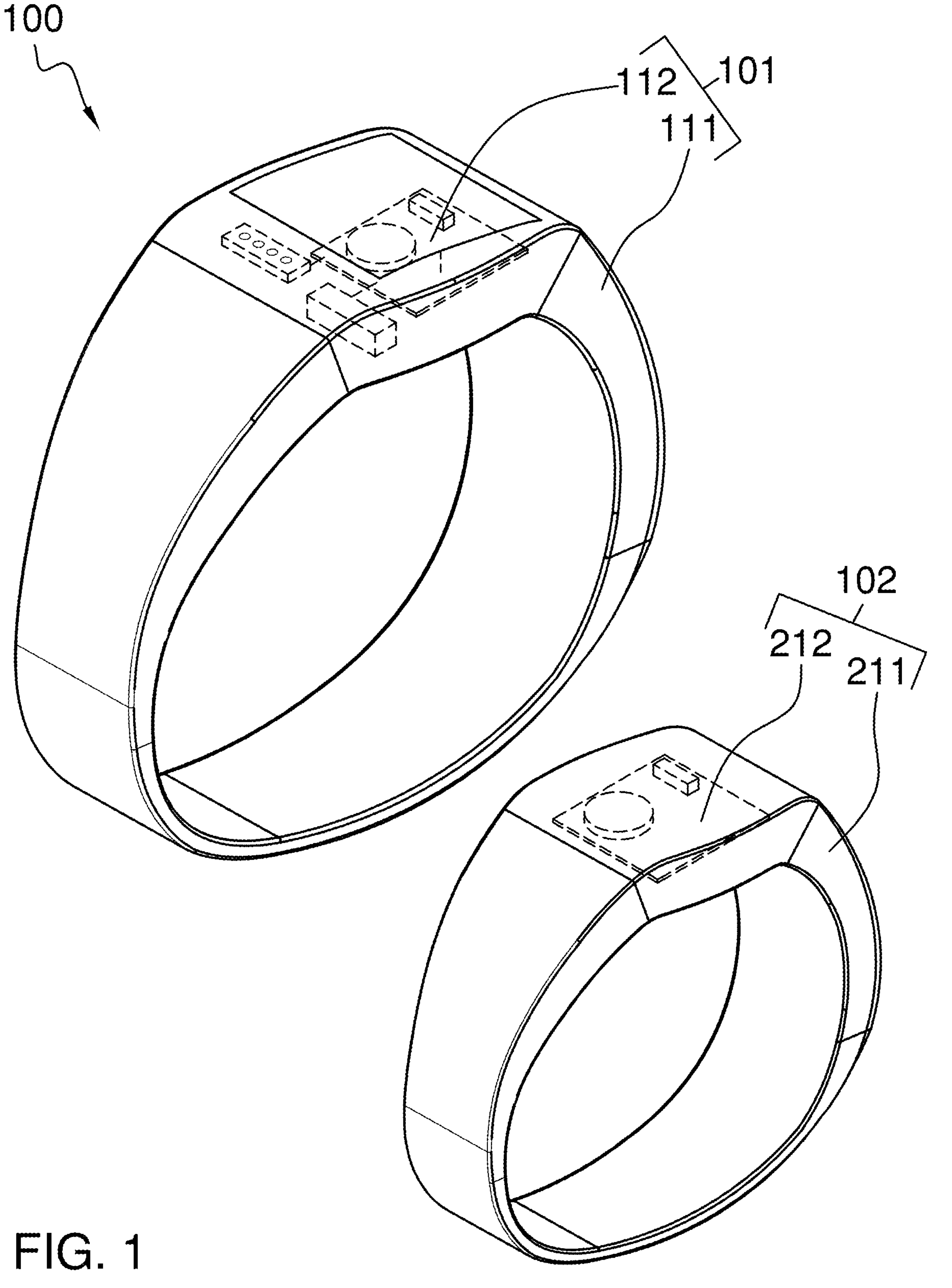
FIG. 1 is a perspective view of an embodiment of the disclosure.
Figure 2:
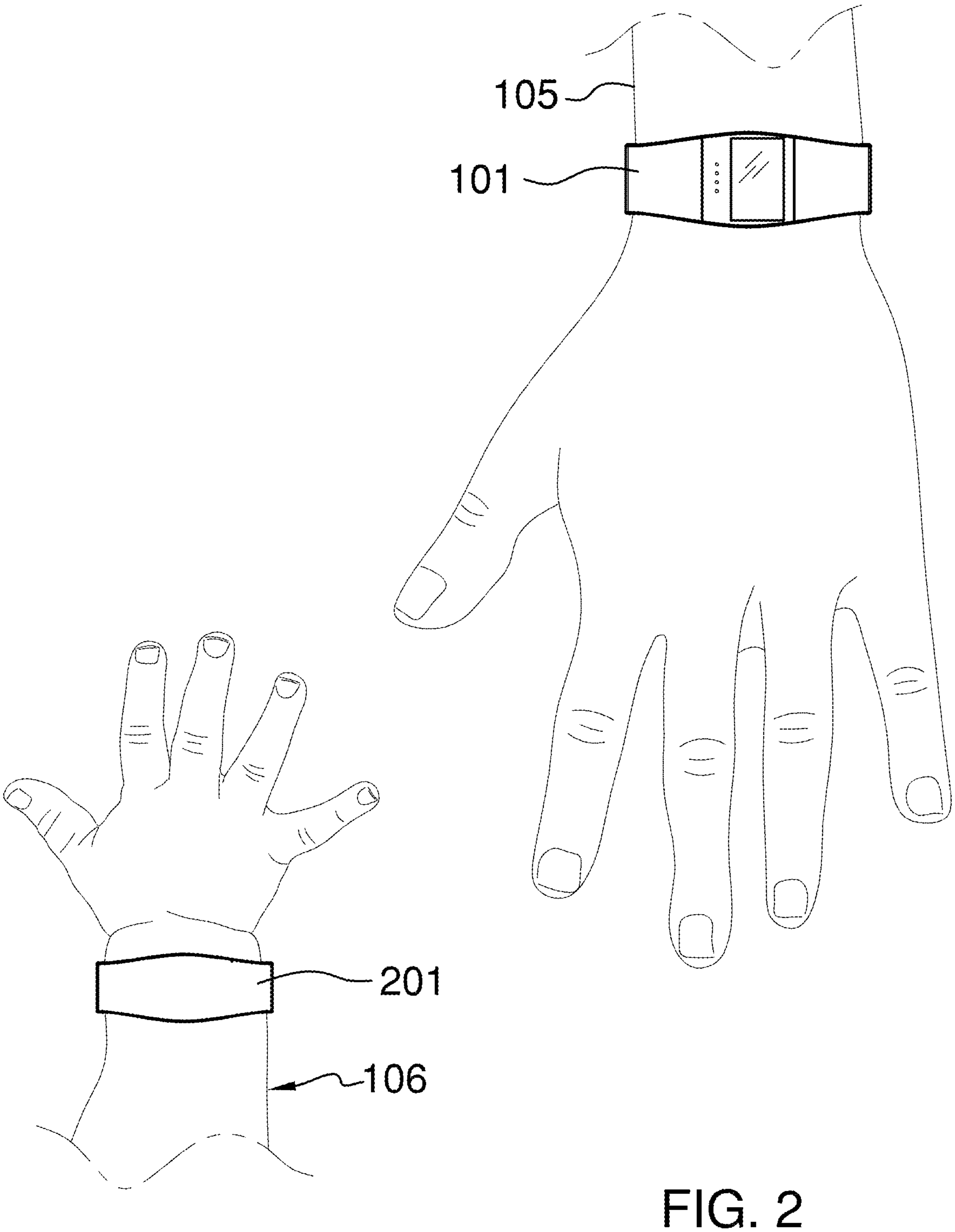
FIG. 2 is an in-use view of an embodiment of the disclosure.
Figure 3:
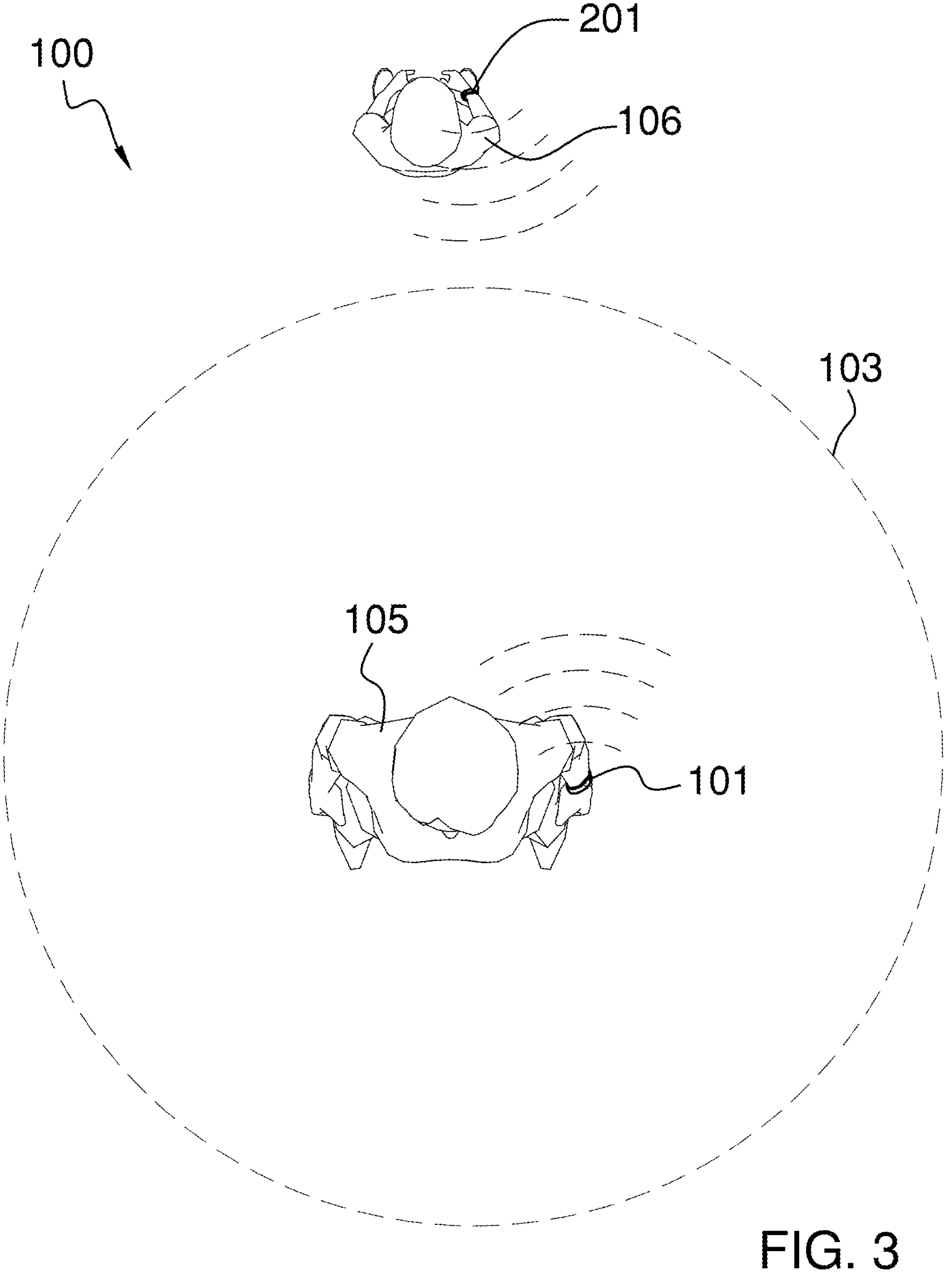
FIG. 3 is an in-use view of an embodiment of the disclosure.
Figure 4:
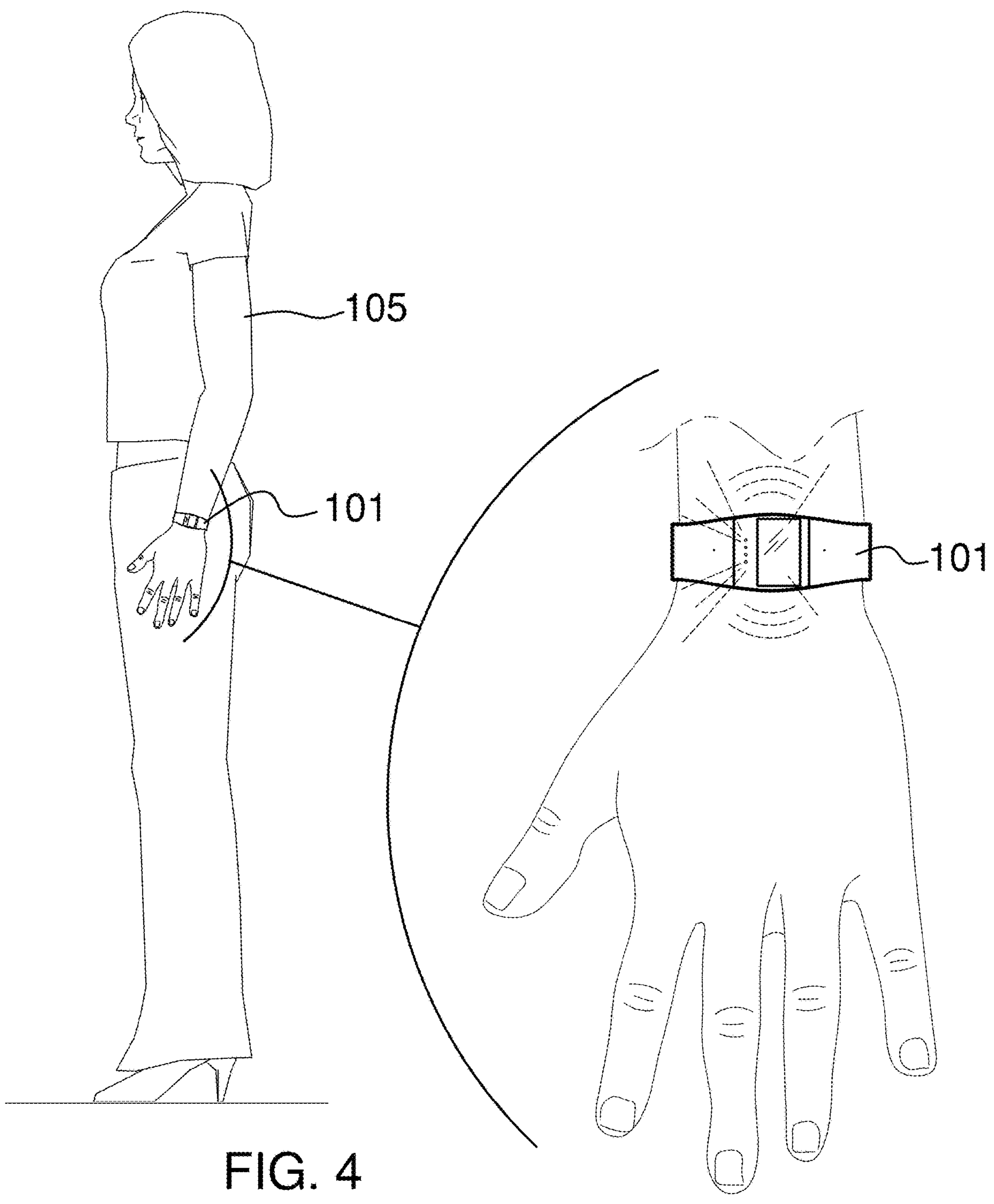
FIG. 4 is an in-use view of an embodiment of the disclosure.
Figure 5:
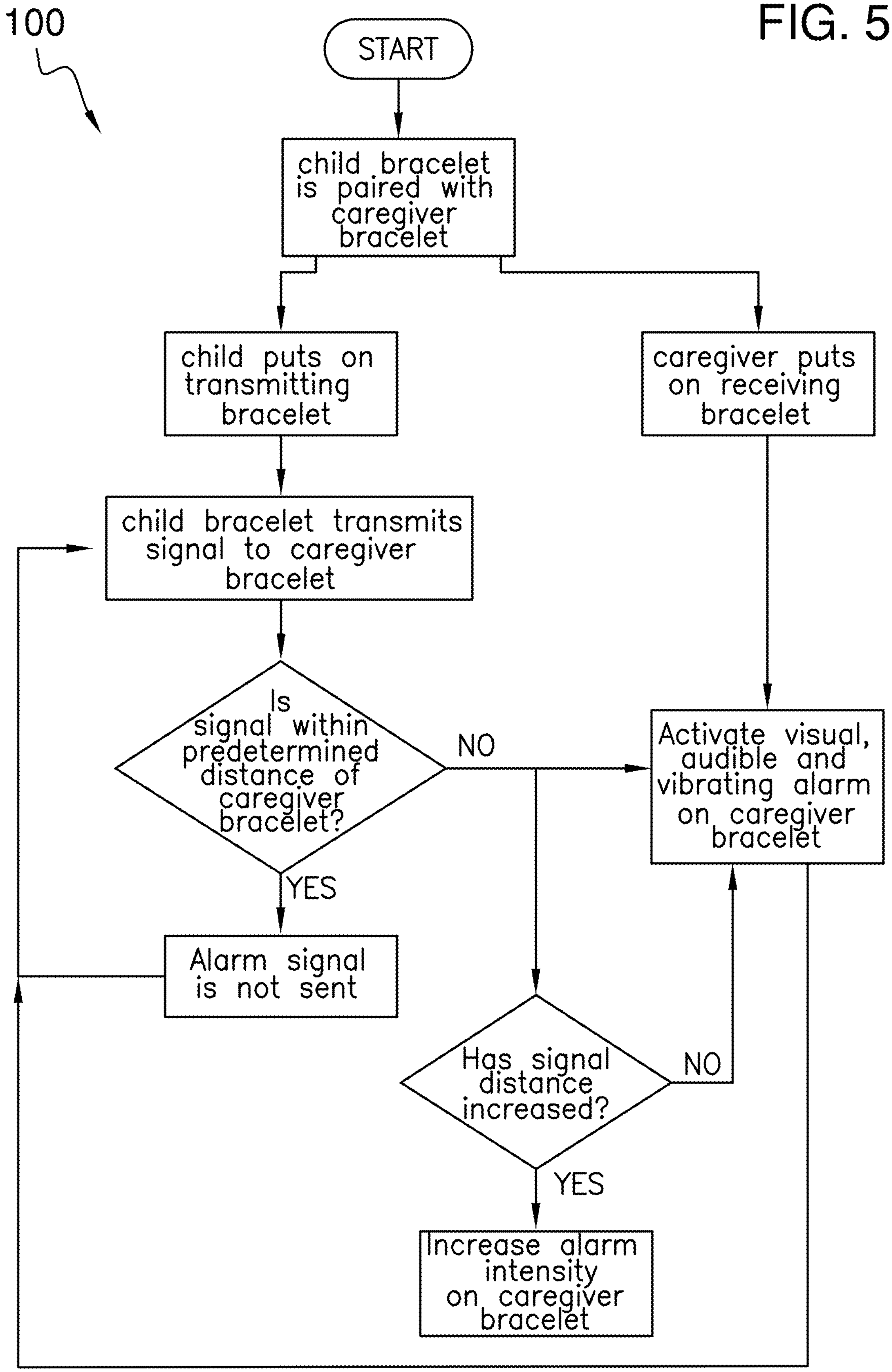
FIG. 5 is a block diagram of an embodiment of the disclosure.
Figure 6:
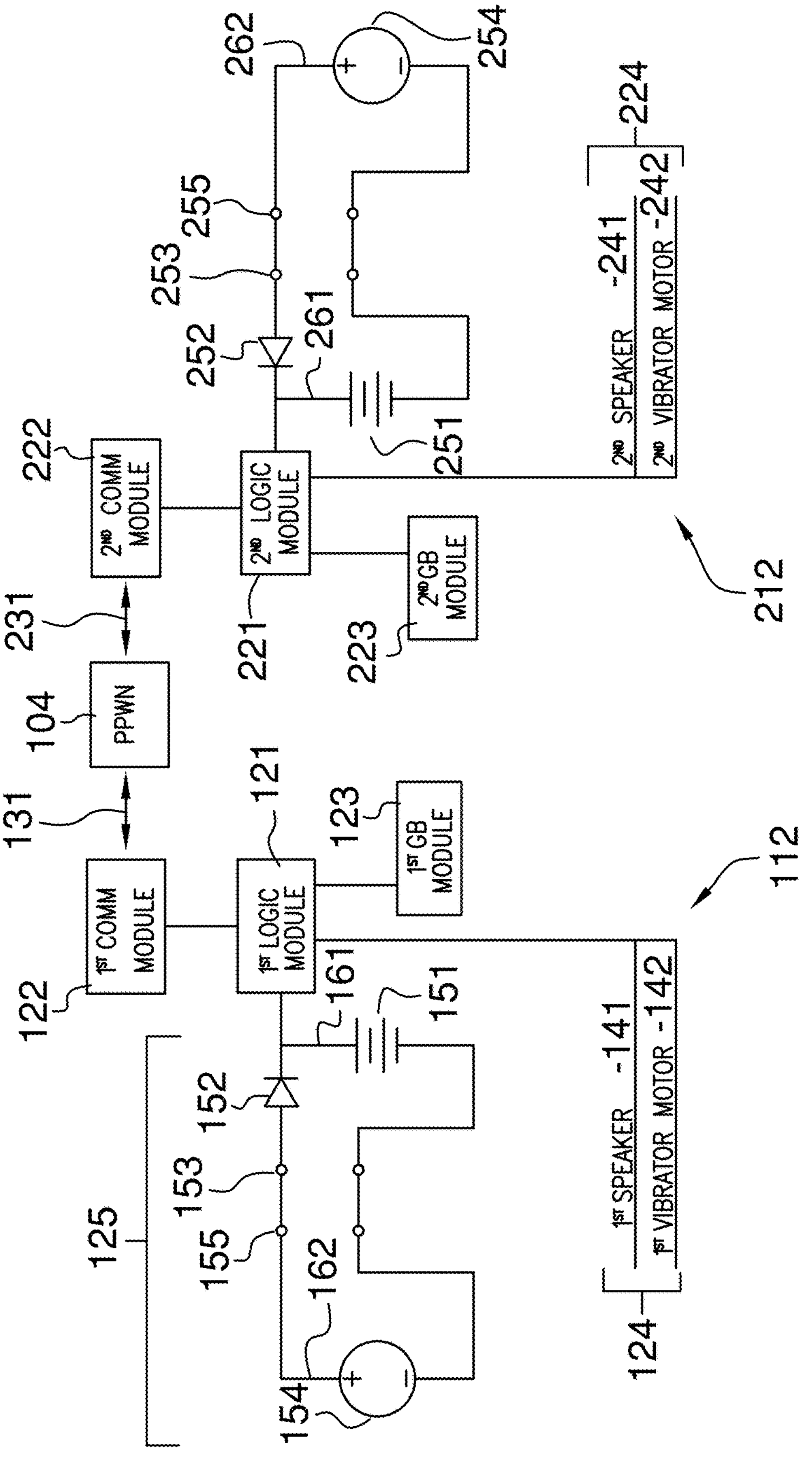
FIG. 6 is a schematic view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Detailed reference will now be made to one or more potential embodiments of the disclosure, which are illustrated in FIGS. 1 through 6.

The separation alert bracelet system 100 (hereinafter invention) is an alarm system. The invention 100 is adapted for use with a guardian 105 and a ward 106. The invention 100 establishes and monitors a virtual protected space 103. The invention 100 centers the virtual protected space 103 on the guardian 105. The invention 100 monitors the position of the ward 106 relative to the virtual protected space 103. The invention 100 generates an alarm when the location of the ward 106 is not within the boundary of the virtual protected space 103. The invention 100 comprises a first jewelry item 101 and a second jewelry item 201. The first jewelry item 101 is worn by the guardian 105. The second jewelry item 201 is worn by the ward 106.

The guardian 105 refers to an individual who is responsible for the health and well-being of the ward 106. The ward 106 is the individual who is in the custody of the guardian 105. The virtual protected space 103 is a virtually defined area of space that is centered on the GPS coordinates of the first jewelry item 101. The virtual protected space 103 defines the boundaries of what is considered to be a safe span of distance between the ward 106 and the guardian 105. The first jewelry item 101 generates an alarm when the GPS coordinates of the ward are not contained within the boundaries of the virtual protected space 103. The second jewelry item 201 generates an alarm when the GPS coordinates of the ward 106 are not contained within the boundaries of the virtual protected space 103.

The first jewelry item 101 is a physical structure. The first jewelry item 101 is an electrically powered structure. The first jewelry item 101 is maintained in the custody of the guardian 105. The first jewelry item 101 is worn by the guardian 105 as a piece of jewelry. The first jewelry item 101 monitors the GPS coordinates of the first jewelry item 101. The first jewelry item 101 establishes a communication link with the second jewelry item 201. The first jewelry item 101 monitors the GPS coordinates of the second jewelry item 201. The first jewelry item 101 comprises a first bracelet structure 111 and a first control circuit 112.

The first bracelet structure 111 is the structure that forms the jewelry item of the first jewelry item 101. The first bracelet structure 111 is worn as jewelry by the guardian 105. The first bracelet structure 111 is a hollow structure. The first bracelet structure 111 forms a housing that contains and encloses the first control circuit 112.

The first control circuit 112 is an electric circuit. The first control circuit 112 monitors the GPS coordinates of the first control circuit 112. The first control circuit 112 forms a first wireless communication link 131 between the first jewelry item 101 and the second jewelry item 201. The first control circuit 112 uses the GPS coordinates of the first control circuit 112 to calculate the perimeter of the virtual protected space 103. The first control circuit 112 receives the GPS coordinates of the second jewelry item 201 over the first wireless communication link 131. The first control circuit 112 compares the received GPS coordinates of the second jewelry item 201 to determine whether the second jewelry item 201 is within the calculated perimeter of the virtual protected space 103. The first control circuit 112 transmits an alarm signal to the guardian 105 when the first control circuit 112 detects that the ward 106 has escaped the virtual protected space 103.

The first control circuit 112 comprises a first logic circuit 121, a first communication module 122, a first gps module 123, a first plurality of alarm devices 124, and a first power circuit 125. The first logic circuit 121, the first communication module 122, the first gps module 123, the first plurality of alarm devices 124, and the first power circuit 125 are electrically interconnected The first logic module 121 is a programmable electronic device that is used to manage, regulate, and operate the first control circuit 112. The first communication module 122 is a wireless electronic communication device that allows the first logic module 121 to wirelessly communicate with the ward 106. The first communication module 122 further comprises a first wireless communication link 131, and a commercially provided and publicly available cellular wireless network 104. The first communication module 122 forms the first wireless communication link 131 with the commercially provided and publicly available cellular wireless network 104. The commercially provided and publicly available cellular wireless network 104 establishes a communication link between the guardian 105 and the ward 106. The first communication module 122 exchanges one or more direct messaging facilities that are transmitted over the first wireless communication link 131 to the second control circuit 212. The message contained in the direct messaging facility contains: a) the GPS coordinates of the first control circuit 112; b) the GPS coordinates of the second control circuit 212; and, c) the radius of virtual protected space that is centered on the GPS coordinates of the first control circuit 112.

In the first potential embodiment of the disclosure, the first communication module 122 communicates the direct messaging facilities as SMS and MMS messages between the first control circuit 111 and the second control circuit 112 through the commercially provided and publicly available cellular wireless network 104. The use of a commercially provided and publicly available cellular wireless network is preferred because: a) of its low cost; b) of the widespread availability and the broad interoperability between competing commercially provided and publicly available cellular wireless networks; and, c) methods and techniques to send SMS and MMS messages over a commercially provided and publicly available cellular wireless network are well known and documented by those skilled in the electrical arts.

The first GPS module 123 is an electrical device that communicates with the GPS to determine the GPS coordinates of the first GPS module 123. When queried by the first logic module 121, the first GPS module 123 transfers the GPS coordinates to the first logic module 121. The first logic module 121 includes the GPS coordinates of the first GPS module 123 with any messaging facility generated by the first logic module 121.

The first logic circuit 121 monitors the GPS coordinates of the first control circuit 112. The first logic circuit 121 uses the GPS coordinates of the first control circuit 112 to calculate the perimeter of the virtual protected space 103. The first logic circuit 121 receives the GPS coordinates of the second jewelry item 201 through the first communication module 122. The first logic circuit 121 compares the received GPS coordinates of the second jewelry item 201 to determine whether the second jewelry item 201 is within the calculated perimeter of the virtual protected space 103. The first logic circuit 121 electrically connects to each alarm device selected from the first plurality of alarm devices 124. The first logic circuit 121 controls the operation of each alarm device selected from the first plurality of alarm devices 124. The first logic circuit 121 initiates the first plurality of alarm devices 124 to generate an alarm when the first logic circuit 121 calculates that the ward 106 has escaped the virtual protected space 103.

The first plurality of alarm devices 124 comprises a collection of transducers. The first plurality of alarm devices 124 electrically connect to the first logic circuit 121. The first logic circuit 121 controls the operation of each alarm device selected from the first plurality of alarm devices 124.

The first logic circuit 121 initiates the operation of each alarm device selected from the first plurality of alarm devices when the first logic circuit 121 calculates that the virtual protected space 103 has escaped the virtual protected space 103.

The first plurality of alarm devices 124 comprises a first speaker 141 and a first vibration motor 142. The first speaker 141 is a transducer. The first speaker 141 converts electric energy into an audible sound. The first speaker 141 receives the electric energy from the first logic circuit 121. The first speaker 141 announces the audible sound. The first vibration motor 142 is an electric motor. The first vibration motor 142 converts electric energy into a mechanical vibration. The first vibration motor 142 receives the electric energy from the first logic circuit 121. The first vibration motor 142 releases the mechanical vibration into the first bracelet structure 111 such that the guardian 105 can feel the generated mechanical vibration as a tactile sensation.

The first power circuit 125 is an electrical circuit. The first power circuit 125 powers the operation of the first control circuit 112. The first power circuit 125 is an electrochemical device. The first power circuit 125 converts chemical potential energy into the electrical energy required to power the first control circuit 112. The first control circuit 112 is an independently powered electric circuit. By independently powered is meant that the first control circuit 112 can operate without an electrical connection to a first external power source 154. The first power circuit 125 comprises a first battery 151, a first diode 152, a first charging port 153, and a first external power source 154. The first battery 151 further comprises a first positive terminal 161. The first external power source 154 further comprises a first charging plug 155 and a second positive terminal 162. The first battery 151, the first diode 152, the first charging port 153, the first external power source 154, and the first charging plug 155 are electrically interconnected.

The first battery 151 is an electrochemical device. The first battery 151 converts chemical potential energy into the electrical energy used to power the first control circuit 112. The first battery 151 is a commercially available rechargeable first battery 151. The chemical energy stored within the rechargeable first battery 151 is renewed and restored through use of the first charging port 153. The first charging port 153 is an electrical circuit that reverses the polarity of the rechargeable first battery 151 and provides the energy necessary to reverse the chemical processes that the rechargeable first battery 151 initially used to generate the electrical energy. This reversal of the chemical process creates a chemical potential energy that will later be used by the rechargeable first battery 151 to generate electricity.

The first charging port 153 forms an electrical connection to a first external power source 154 using a first charging plug 155. The first charging plug 155 forms a detachable electrical connection with the first charging port 153. The first charging port 153 receives electrical energy from the first external power source 154 through the first charging plug 155. The first diode 152 is an electrical device that allows current to flow in only one direction. The first diode 152 installs between the rechargeable first battery 151 and the first charging port 153 such that electricity will not flow from the first positive terminal 161 of the rechargeable first battery 151 into the second positive terminal 162 of the first external power source 154. In the first potential embodiment of the disclosure, the first external power source 154, the first charging plug 155, and the first charging port 153 are compatible with USB power requirements.

The second jewelry item 201 is a physical structure. The second jewelry item 201 is an electrically powered structure. The second jewelry item 201 is maintained in the custody of the ward 106. The second jewelry item 201 is worn by the ward 106 as a piece of jewelry. The second jewelry item 201 monitors the GPS coordinates of the second jewelry item 201. The second jewelry item 201 establishes a communication link with the first jewelry item 101. The second jewelry item 201 monitors the GPS coordinates of the first jewelry item 101. The second jewelry item 201 comprises a second bracelet structure 211 and a second control circuit 212.

The second bracelet structure 211 is the structure that forms the jewelry item of the second jewelry item 201. The second bracelet structure 211 is worn as jewelry by the ward 106. The second bracelet structure 211 is a hollow structure. The second bracelet structure 211 forms a housing that contains and encloses the second control circuit 212.

The second control circuit 212 is an electric circuit. The second control circuit 212 monitors the GPS coordinates of the second control circuit 212. The second control circuit 212 forms a second wireless communication link 231 between the second jewelry item 201 and the first jewelry item 101. The second control circuit 212 uses the GPS coordinates of the second control circuit 212 to calculate the perimeter of the virtual protected space 103. The second control circuit 212 receives the GPS coordinates of the first jewelry item 101 over the second wireless communication link 231. The second control circuit 212 compares the received GPS coordinates of the first jewelry item 101 to determine whether the first jewelry item 101 is within the calculated perimeter of the virtual protected space 103. The second control circuit 212 transmits an alarm signal to the ward 106 when the second control circuit 212 detects that the ward 106 has escaped the virtual protected space 103.

The second control circuit 212 comprises a second logic circuit 221, a second communication module 222, a second gps module 223, a second plurality of alarm devices 224, and a second power circuit 225. The second logic circuit 221, the second communication module 222, the second gps module 223, the second plurality of alarm devices 224, and the second power circuit 225 are electrically interconnected The second logic module 221 is a programmable electronic device that is used to manage, regulate, and operate the second control circuit 212. The second communication module 222 is a wireless electronic communication device that allows the second logic module 221 to wirelessly communicate with the guardian 105. The second communication module 222 further comprises a second wireless communication link 231, and the commercially provided and publicly available cellular wireless network 104. The second communication module 222 forms the second wireless communication link 231 with the commercially provided and publicly available cellular wireless network 104. The commercially provided and publicly available cellular wireless network 104 establishes a communication link between the guardian 205 and the ward 206. The second communication module 222 exchanges one or more direct messaging facilities that are transmitted over the second wireless communication link 231 to the first control circuit 112. The message contained in the direct messaging facility contains: a) the GPS coordinates of the first control circuit 112; b) the GPS coordinates of the second control circuit 212; and, c) the radius of virtual protected space that is centered on the GPS coordinates of the first control circuit 112.

In the second potential embodiment of the disclosure, the second communication module 222 communicates the direct messaging facilities as SMS and MMS messages between the second control circuit 201 and the second control circuit 202 through the commercially provided and publicly available cellular wireless network 204. The use of a commercially provided and publicly available cellular wireless network is preferred because: a) of its low cost; b) of the widespread availability and the broad interoperability between competing commercially provided and publicly available cellular wireless networks; and, c) methods and techniques to send SMS and MMS messages over a commercially provided and publicly available cellular wireless network are well known and documented by those skilled in the electrical arts.

The second GPS module 223 is an electrical device that communicates with the GPS to determine the GPS coordinates of the second GPS module 223. When queried by the second logic module 221, the second GPS module 223 transfers the GPS coordinates to the second logic module 221. The second logic module 221 includes the GPS coordinates of the second GPS module 223 with any messaging facility generated by the second logic module 221.

The second logic circuit 221 monitors the GPS coordinates of the second control circuit 212. The second logic circuit 221 uses the GPS coordinates of the second control circuit 212 to calculate the perimeter of the virtual protected space 103. The second logic circuit 221 receives the GPS coordinates of the first jewelry item 101 through the second communication module 222. The second logic circuit 221 uses the received GPS coordinates from the first jewelry item 101 to calculate the perimeter of the virtual protected space 103. The second logic circuit 221 uses the calculated perimeter of the virtual protected space 103 to determine whether the ward 106 is within the calculated perimeter of the virtual protected space 103. The second logic circuit 221 electrically connects to each alarm device selected from the second plurality of alarm devices 224. The second logic circuit 221 controls the operation of each alarm device selected from the second plurality of alarm devices 224. The second logic circuit 221 initiates the second plurality of alarm devices 224 to generate an alarm when the second logic circuit 221 calculates that the ward 106 has escaped the virtual protected space 103.

The second plurality of alarm devices 224 comprises a collection of transducers. The second plurality of alarm devices 224 electrically connect to the second logic circuit 221. The second logic circuit 221 controls the operation of each alarm device selected from the second plurality of alarm 9 devices 224. The second logic circuit 221 initiates the operation of each alarm device selected from the second plurality of alarm devices 224 when the second logic circuit 221 calculates that the virtual protected space 103 has escaped the virtual protected space 103.

The second plurality of alarm devices 224 comprises a second speaker 241 and a second vibration motor 242. The second speaker 241 is a transducer. The second speaker 241 converts electric energy into an audible sound. The second speaker 241 receives the electric energy from the second logic circuit 221. The second speaker 241 announces the audible sound. The second vibration motor 242 is an electric motor. The second vibration motor 242 converts electric energy into a mechanical vibration. The second vibration motor 242 receives the electric energy from the second logic circuit 221. The second vibration motor 242 releases the mechanical vibration into the second bracelet structure 211 such that the ward 106 can feel the generated mechanical vibration as a tactile sensation.

The second power circuit 225 is an electrical circuit. The second power circuit 225 powers the operation of the second control circuit 212. The second power circuit 225 is an electrochemical device. The second power circuit 225 converts chemical potential energy into the electrical energy required to power the second control circuit 212. The second control circuit 212 is an independently powered electric circuit. By independently powered is meant that the second control circuit can operate without an electrical connection to a second external power source 254.

The second power circuit 225 comprises a second battery 251, a second diode 252, a second charging port 253, and a second external power source 254. The second battery 251 further comprises a third positive terminal 261. The second external power source 254 further comprises a second charging plug 255 and a fourth positive terminal 262. The second battery 251, the second diode 252, the second charging port 253, the second external power source 254, and the second charging plug 255 are electrically interconnected.

The second battery 251 is an electrochemical device. The second battery 251 converts chemical potential energy into the electrical energy used to power the second control circuit 212. The second battery 251 is a commercially available rechargeable second battery 251. The chemical energy stored within the rechargeable second battery 251 is renewed and restored through use of the second charging port 253. The second charging port 253 is an electrical circuit that reverses the polarity of the rechargeable second battery 251 and provides the energy necessary to reverse the chemical processes that the rechargeable second battery 251 initially used to generate the electrical energy. This reversal of the chemical process creates a chemical potential energy that will later be used by the rechargeable second battery 251 to generate electricity.

The second charging port 253 forms an electrical connection to a second external power source 254 using a second charging plug 255. The second charging plug 255 forms a detachable electrical connection with the second charging port 253. The second charging port 253 receives electrical energy from the second external power source 254 through the second charging plug 255. The second diode 252 is an electrical device that allows current to flow in only one direction. The second diode 252 installs between the rechargeable second battery 251 and the second charging port 253 such that electricity will not flow from the third positive terminal 261 of the rechargeable second battery 251 into the fourth positive terminal 262 of the second external power source 254. In the second potential embodiment of the disclosure, the second external power source 254, the second charging plug 255, and the second charging port 253 are compatible with USB power requirements.

The following definitions were used in this disclosure:

Announce: As used in this disclosure, to announce means to generate audible sounds over a transducer. Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Bracelet: As used in this disclosure, a bracelet is a ring structure that is worn around a wrist or an ankle.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Commercially Provided And Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Control Circuit: As used in this disclosure, a control circuit is an electrical circuit that manages and regulates the behavior or operation of a device.

Custody: As used in this disclosure, custody refers to an object or person that is under the physical control or care of a guardian. The guardian is an appropriate authority responsible for the proper operation, appropriate use, or well-being of the object or person that is in custody. A person in the custody of a guardian is referred to as a ward.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Email: As used in this disclosure, email describes a communication between a sender and one or more receivers that is delivered through a network wherein the nodes of the network comprise a plurality of logical devices. An email will generally comprise a text based communication component.

External Power Source: As used in this disclosure, an external power source is a source of the energy that is externally provided to enable the operation of the present disclosure. Examples of external power sources include, but are not limited to, electrical power sources and compressed air sources.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Jewelry: As used in this disclosure, jewelry is a personal decorative item that is worn by a person. Examples of jewelry include, but are not limited to, necklaces, bracelets, rings, earrings, cufflinks, brooches, and wristwatches.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A 9 traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Microphone: As used in this disclosure, a microphone is a transducer that converts the energy from vibration into electrical energy. The sources of vibrations include, but are not limited to, acoustic energy.

Motor: As used in this disclosure, a motor refers to the method of transferring energy from an external power source into mechanical energy.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publicly provided wireless network. The PPWN refers to a commercially provided and publicly available cellular wireless network.

Ring: As used in this disclosure, a ring is a term that is used to describe a disk-like structure through which a negative space is formed through the faces of the disk-like structure. Rings are often considered loops. The negative space formed through the faces of the disk-like structure is called the characteristic aperture.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Speaker: As used in this disclosure, a speaker is an electrical transducer that converts an electrical signal into an audible sound.

Transducer: As used in this disclosure, a transducer is a device that converts a physical quantity, such as pressure or brightness into an electrical signal or a device that converts an electrical signal into a physical quantity.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

Virtual Protected Space: As used in this disclosure, a virtual protected space refers to a hypothetical boundary that encloses a space. By hypothetical boundary is meant that the boundary is defined but does not have a physical structure that forms a barrier that would identify the location of the boundary. An object contained within the virtual protected space is referred to as protected, safe, or normal. An object that is not contained within the virtual protected space is referred to as unprotected, unsafe, abnormal, or escaped. A protected space that is not fully enclosed by a physical barrier is referred to as a mixed protected space. The open portions of the mixed protected space is referred to as a virtual boundary. A virtual fence is an example of a virtual protected space.

Watch: As used in this disclosure, a watch is a clock that is carried or worn by a person.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A separation alert bracelet system comprising a first jewelry item and a second jewelry item;
- wherein the first jewelry item forms a wireless communication link with the second jewelry item;
- wherein the separation alert bracelet system is an alarm system;
- wherein the separation alert bracelet system is adapted for use with a guardian and a ward;
- wherein the first jewelry item is worn by the guardian;
- wherein the second jewelry item is worn by the ward;
- wherein the separation alert bracelet system establishes and monitors a virtual protected space;
- wherein the first jewelry item comprises a first control circuit;
- wherein the second jewelry item comprises a second control circuit;
- wherein the first control circuit comprises a first logic circuit, and a first communication module;
- wherein the first communication module further comprises a first wireless communication link, and a commercially provided and publicly available cellular wireless network;
- wherein the first communication module forms the first wireless communication link with the commercially provided and publicly available cellular wireless network;
- wherein the commercially provided and publicly available cellular wireless network establishes a communication link between the guardian and the ward;
- wherein the first communication module exchanges one or more direct messaging facilities that are transmitted over the first wireless communication link to the second control circuit;
- wherein a message contained in the one or more direct messaging facilities contains: a) a global positioning system (hereinafter gps) coordinates of the first control circuit; b) gps coordinates of the second control circuit; and, c) a radius of virtual protected space that is centered on the gps coordinates of the first control circuit.

2. The separation alert bracelet system according to claim 1
- wherein the separation alert bracelet system centers the virtual protected space on the guardian;
- wherein the virtual protected space is a virtually defined area of space that is centered on the gps coordinates of the first jewelry item;
- wherein the separation alert bracelet system monitors the position of the ward relative to the virtual protected space;
- wherein the separation alert bracelet system generates an alarm when the location of the ward is not within the boundary of the virtual protected space;
- wherein the first jewelry item generates an alarm when the gps coordinates of the ward are not contained within the boundaries of the virtual protected space;
- wherein the second jewelry item generates an alarm when the gps coordinates of the ward are not contained within the boundaries of the virtual protected space.

3. The separation alert bracelet system according to claim 2
- wherein the first jewelry item is a physical structure;
- wherein the first jewelry item is an electrically powered structure;

wherein the first jewelry item monitors the gps coordinates of the first jewelry item;

wherein the first jewelry item establishes a communication link with the second jewelry item;

wherein the first jewelry item monitors the gps coordinates of the second jewelry item;

wherein the second jewelry item is a physical structure;

wherein the second jewelry item is an electrically powered structure;

wherein the second jewelry item monitors the gps coordinates of the second jewelry item;

wherein the second jewelry item establishes a communication link with the first jewelry item;

wherein the second jewelry item monitors the gps coordinates of the first jewelry item.

4. The separation alert bracelet system according to claim 3 wherein the first jewelry item comprises a first bracelet structure and the first control circuit;

wherein the first bracelet structure is a hollow structure;

wherein the first bracelet structure forms a housing that contains and encloses the first control circuit;

wherein the second jewelry item comprises the second bracelet structure and a second control circuit;

wherein the second bracelet structure is a hollow structure;

wherein the second bracelet structure forms a housing that contains and encloses the second control circuit.

5. The separation alert bracelet system according to claim 4 wherein the first control circuit is an electric circuit;

wherein the first control circuit monitors the gps coordinates of the first control circuit;

wherein the first control circuit forms a first wireless communication link between the first jewelry item and the second jewelry item;

wherein the first control circuit uses the gps coordinates of the first control circuit to calculate the perimeter of the virtual protected space;

wherein the first control circuit receives the gps coordinates of the second jewelry item over the first wireless communication link;

wherein the first control circuit compares the received gps coordinates of the second jewelry item to determine whether the second jewelry item is within the calculated perimeter of the virtual protected space;

wherein the first control circuit transmits an alarm signal to the guardian when the first control circuit detects that the ward has escaped the virtual protected space.

6. The separation alert bracelet system according to claim 5 wherein the second control circuit is an electric circuit;

wherein the second control circuit monitors the gps coordinates of the second control circuit;

wherein the second control circuit forms a second wireless communication link between the second jewelry item and the first jewelry item;

wherein the second control circuit uses the gps coordinates of the second control circuit to calculate the perimeter of the virtual protected space;

wherein the second control circuit receives the gps coordinates of the first jewelry item over the second wireless communication link;

wherein the second control circuit compares the received gps coordinates of the first jewelry item to determine whether the first jewelry item is within the calculated perimeter of the virtual protected space;

wherein the second control circuit transmits an alarm signal to the ward when the second control circuit detects that the ward has escaped the virtual protected space.

7. The separation alert bracelet system according to claim 6 wherein the first control circuit comprises the first logic circuit, the first communication module, a first gps module, a first plurality of alarm devices, and a first power circuit;

wherein the first logic circuit, the first communication module, the first gps module, the first plurality of alarm devices, and the first power circuit are electrically interconnected;

wherein the second control circuit comprises a second logic circuit, a second communication module, a second gps module, a second plurality of alarm devices, and a second power circuit;

wherein the second logic circuit, the second communication module, the second gps module, the second plurality of alarm devices, and the second power circuit are electrically interconnected.

8. The separation alert bracelet system according to claim 7 wherein the second logic module is a programmable electronic device that is used to manage, regulate, and operate the second control circuit;

wherein the second communication module is a wireless electronic communication device that allows the second logic module to wirelessly communicate with the guardian;

wherein the second communication module further comprises a second wireless communication link, and the commercially provided and publicly available cellular wireless network;

wherein the second communication module forms the second wireless communication link with the commercially provided and publicly available cellular wireless network;

wherein the commercially provided and publicly available cellular wireless network establishes a communication link between the guardian and the ward;

wherein the second communication module exchanges one or more direct messaging facilities that are transmitted over the second wireless communication link to the first control circuit;

wherein a message contained in the one or more direct messaging facilities that are transmitted over the second wireless communication link contains: a) the gps coordinates of the first control circuit; b) the gps coordinates of the second control circuit; and, c) the radius of virtual protected space that is centered on the gps coordinates of the first control circuit.

9. The separation alert bracelet system according to claim 8 wherein the first gps module is an electrical device that communicates with the gps to determine the gps coordinates of the first gps module;

wherein when queried by the first logic module, the first gps module transfers the gps coordinates to the first logic module;

wherein the second gps module is an electrical device that communicates with the gps to determine the gps coordinates of the second gps module;

wherein when queried by the second logic module, the second gps module transfers the gps coordinates to the second logic module.

10. The separation alert bracelet system according to claim 9 wherein the first logic circuit monitors the gps coordinates of the first control circuit;

wherein the first logic circuit uses the gps coordinates of the first control circuit to calculate the perimeter of the virtual protected space;

wherein the first logic circuit receives the gps coordinates of the second jewelry item through the first communication module;

wherein the first logic circuit compares the received gps coordinates of the second jewelry item to determine whether the second jewelry item is within the calculated perimeter of the virtual protected space;

wherein the first logic circuit electrically connects to each alarm device selected from the first plurality of alarm devices;

wherein the first logic circuit controls the operation of each alarm device selected from the first plurality of alarm devices;

wherein the first logic circuit initiates the first plurality of alarm devices to generate an alarm when the first logic circuit calculates that the ward has escaped the virtual protected space;

wherein the second logic circuit monitors the gps coordinates of the second control circuit;

wherein the second logic circuit uses the gps coordinates of the second control circuit to calculate the perimeter of the virtual protected space;

wherein the second logic circuit receives the gps coordinates of the first jewelry item through the second communication module;

wherein the second logic circuit uses the received gps coordinates from the first jewelry item to calculate the perimeter of the virtual protected space;

wherein the second logic circuit uses the calculated perimeter of the virtual protected space to determine whether the ward is within the calculated perimeter of the virtual protected space;

wherein the second logic circuit electrically connects to each alarm device selected from the second plurality of alarm devices;

wherein the second logic circuit controls the operation of each alarm device selected from the second plurality of alarm devices;

wherein the second logic circuit initiates the second plurality of alarm devices to generate an alarm when the second logic circuit calculates that the ward has escaped the virtual protected space.

11. The separation alert bracelet system according to claim 10 wherein the first plurality of alarm devices comprises a collection of transducers;

wherein the first plurality of alarm devices electrically connect to the first logic circuit;

wherein the first logic circuit controls the operation of each alarm device selected from the first plurality of alarm devices;

wherein the first logic circuit initiates the operation of each alarm device selected from the first plurality of alarm devices when the first logic circuit calculates that the virtual protected space has escaped the virtual protected space;

wherein the second plurality of alarm devices comprises a collection of transducers;

wherein the second plurality of alarm devices electrically connect to the second logic circuit;

wherein the second logic circuit controls the operation of each alarm device selected from the second plurality of alarm devices;

wherein the second logic circuit initiates the operation of each alarm device selected from the second plurality of alarm devices when the second logic circuit calculates that the virtual protected space has escaped the virtual protected space.

12. The separation alert bracelet system according to claim 11 wherein the first power circuit is an electrical circuit;

wherein the first power circuit powers the operation of the first control circuit;

wherein the first power circuit is an electrochemical device;

wherein the first power circuit converts chemical potential energy into the electrical energy required to power the first control circuit;

wherein the first control circuit is an independently powered electric circuit;

wherein by independently powered is meant that the first control circuit can operate without an electrical connection to a first external power source;

wherein the second power circuit is an electrical circuit;

wherein the second power circuit powers the operation of the second control circuit;

wherein the second power circuit is an electrochemical device;

wherein the second power circuit converts chemical potential energy into the electrical energy required to power the second control circuit;

wherein the second control circuit is an independently powered electric circuit;

wherein by independently powered is meant that the second control circuit can operate without an electrical connection to a second external power source.

13. The separation alert bracelet system according to claim 12 wherein the first plurality of alarm devices comprises a first speaker and a first vibration motor;

wherein the first speaker is a transducer;

wherein the first speaker converts electric energy into an audible sound;

wherein the first speaker receives the electric energy from the first logic circuit;

wherein the first speaker announces the audible sound;

wherein the first vibration motor is an electric motor;

wherein the first vibration motor converts electric energy into a mechanical vibration;

wherein the first vibration motor receives the electric energy from the first logic circuit;

wherein the first vibration motor releases the mechanical vibration into the first bracelet structure such that the guardian can feel the generated mechanical vibration as a tactile sensation;

wherein the second plurality of alarm devices comprises a second speaker and a second vibration motor;

wherein the second speaker is a transducer;

wherein the second speaker converts electric energy into an audible sound;

wherein the second speaker receives the electric energy from the second logic circuit;

wherein the second speaker announces the audible sound;

wherein the second vibration motor is an electric motor;

wherein the second vibration motor converts electric energy into a mechanical vibration;

wherein the second vibration motor receives the electric energy from the second logic circuit;

wherein the second vibration motor releases the mechanical vibration into the second bracelet structure such that the ward can feel the generated mechanical vibration as a tactile sensation.

* * * * *